US011613216B2

(12) United States Patent
Ildiz et al.

(10) Patent No.: US 11,613,216 B2
(45) Date of Patent: Mar. 28, 2023

(54) AUXILIARY POWER SUPPLY FOR A VEHICLE

(71) Applicant: IM Efficiency Technologies B.V., Helmond (NL)

(72) Inventors: Martijn Bekir Ildiz, Heerlen (NL); Jelle Marinus Aarnoudse, Heerlen (NL)

(73) Assignee: IM Efficiency Technologies B.V., Helmond (NL)

( * ) Notice: Subject to any disclaimer, the term of this patent is extended or adjusted under 35 U.S.C. 154(b) by 90 days.

(21) Appl. No.: 16/623,422

(22) PCT Filed: Jun. 14, 2018

(86) PCT No.: PCT/EP2018/065868
§ 371 (c)(1),
(2) Date: Dec. 17, 2019

(87) PCT Pub. No.: WO2018/234161
PCT Pub. Date: Dec. 27, 2018

(65) Prior Publication Data
US 2020/0114846 A1    Apr. 16, 2020

(30) Foreign Application Priority Data
Jun. 23, 2017 (EP) ..................... 17177698

(51) Int. Cl.
*B60D 1/62*      (2006.01)
*B60L 55/00*     (2019.01)
*B60R 16/02*     (2006.01)
*B60R 16/033*    (2006.01)
*H02J 3/38*      (2006.01)
*H02J 7/00*      (2006.01)
(Continued)

(52) U.S. Cl.
CPC .............. *B60R 16/033* (2013.01); *B60D 1/62* (2013.01); *B60L 55/00* (2019.02);
(Continued)

(58) Field of Classification Search
CPC .......... B60R 16/033; B60R 16/03; H02J 7/14; H02J 7/35; H02J 7/0049; H02J 2310/46;
(Continued)

(56) References Cited

U.S. PATENT DOCUMENTS 5,725,062 A    3/1998  Fronek
8,536,985 B1 * 9/2013  Wedding ................ H04B 3/542
                                                              340/12.34
(Continued)

FOREIGN PATENT DOCUMENTS

GB    2548631 A  *  9/2017  .............. B60L 58/20
WO    2010123788     10/2010
(Continued)

*Primary Examiner* — Elim Ortiz
(74) *Attorney, Agent, or Firm* — N.V. Nederlandsch Octrooibureau

(57) ABSTRACT

An apparatus for providing power to a vehicle's electric power system comprises a converter (602) for converting electric input electricity having an input voltage into output electricity having an output voltage. A sense line (612) is provided for electrically connecting a control unit (611) to the vehicle's electric power system. A power line (613) is for connecting an output of the converter (602) in parallel to the vehicle's electric power system. The control unit (611) is configured to detect a running state of an alternator (201) of the vehicle based on a measurement of a signal on the sense line (612) and control the converter (602) to set the output voltage in dependence on the detected running state.

10 Claims, 12 Drawing Sheets

(51) Int. Cl.
*H02J 7/35* (2006.01)
*H02J 7/14* (2006.01)
*B60R 16/03* (2006.01)

(52) U.S. Cl.
CPC .......... *B60R 16/0207* (2013.01); *B60R 16/03* (2013.01); *H02J 3/381* (2013.01); *H02J 7/00* (2013.01); *H02J 7/0049* (2020.01); *H02J 7/14* (2013.01); *H02J 7/35* (2013.01); *B60Y 2200/148* (2013.01); *B60Y 2300/91* (2013.01); *B60Y 2400/11* (2013.01); *B60Y 2400/216* (2013.01); *H02J 2300/26* (2020.01); *H02J 2310/40* (2020.01); *H02J 2310/46* (2020.01)

(58) Field of Classification Search
CPC ...... H02J 2310/40; H02J 7/00; H02J 3/38–50; H02J 2300/22–26; Y02T 10/70; B60Y 2400/21; H02S 10/40; B62D 33/04–048; B62D 53/125; B60L 58/00; B60L 58/10; B60L 50/00
USPC ......... 280/215, 216, 221, 223, 230; 307/9.1, 307/10.1, 18, 19, 21, 22, 23, 43, 47, 48, 307/56; 320/101, 138; 323/906; 73/114.59; 363/145
See application file for complete search history.

(56) References Cited

U.S. PATENT DOCUMENTS

| | | | |
|---|---|---|---|
| 9,948,136 B2* | 4/2018 | Doane | H02J 7/1438 |
| 2007/0187957 A1 | 8/2007 | Harrison | |
| 2009/0107743 A1* | 4/2009 | Alston | B60H 1/00428 |
| | | | 903/906 |
| 2010/0282287 A1 | 11/2010 | Corcoran | |
| 2013/0231808 A1 | 9/2013 | Flath et al. | |
| 2014/0116077 A1* | 5/2014 | Pierce | F25B 27/002 |
| | | | 219/202 |
| 2015/0353036 A1 | 12/2015 | Pierce et al. | |
| 2016/0121738 A1* | 5/2016 | Jung | B60L 53/20 |
| | | | 701/22 |
| 2016/0380473 A1* | 12/2016 | Henningson | B60L 53/665 |
| | | | 320/101 |
| 2017/0063104 A1* | 3/2017 | Bean | H02J 7/007 |
| 2019/0366871 A1* | 12/2019 | Baba | H02J 3/32 |

FOREIGN PATENT DOCUMENTS

| | | |
|---|---|---|
| WO | 2010146413 | 12/2010 |
| WO | 2012001256 | 1/2012 |

* cited by examiner

AUXILIARY POWER SUPPLY FOR A VEHICLE

FIELD OF THE INVENTION

The invention relates to an apparatus and method for providing power to a vehicle's electric power system. The invention further relates to a trailer comprising the apparatus. The invention further relates to a vehicle comprising a connector to connect the apparatus to the vehicle.

BACKGROUND OF THE INVENTION

Electricity in a vehicle is typically generated by means of an alternator, which is mechanically powered by a propulsion engine. Electricity in the vehicle thus is generated at the cost of fuel. This process of electricity generation is rather inefficient, because the conversion rate from fuel to electricity generated in this way may be somewhere between 10% and 25%. Moreover, trends are that the demand for electricity in vehicles will increase in the coming years, so that the low efficiency of the electricity generation becomes more relevant.

The electric power generator of a vehicle may comprise an alternating current generator or alternator, a rectifier to convert the alternating current into a direct current, and a voltage regulator. The voltage regulator measures the potential of the electric system of the vehicle and adapts the output voltage of the alternator where necessary. The voltage regulator compares the measured potential with a reference potential. If the potential is too high, the output potential can be reduced and vice versa. The voltage regulator can change the output potential of the alternator using pulse width modulation. The higher the required potential, the longer the pulse of the DC output of the alternator.

A typical nominal potential of a vehicle's electricity system is 24 Volt or 12 Volt. Typical types of vehicles include a truck, a tractor, a lorry, a minivan, a passenger car or a combi. The voltage regulator may be configured to keep the potential of the electric system of the vehicle constantly around a target potential value, for example at around 28.5 Volt in a 24 Volt system. This target potential value may differ for different types of vehicles. The amount of current produced by the alternator depends on the electric consumers ('loads') in the vehicle. The battery is regarded as a load during charging. The alternator has the purpose to supply all the power consumed by the vehicle at any given moment in time. The battery takes over when this is not possible. However, under normal circumstances, typically only one of the battery and the alternator provides (a substantial amount of) power at any given time.

The main function of the battery is twofold. First, to supply loads when the alternator cannot; and second, to absorb any peak potentials that may occur in the electric system of the vehicle. When the vehicle is not running, the battery supplies comfort systems and other relevant systems with power. Also the starter motor is supplied with power by the battery.

As mentioned before, the alternator consumes power generated by the motor to generate electric energy. Thus, the alternator indirectly consumes fuel. The battery also has a limited endurance; after a number of charging/discharging cycles of the battery, the battery needs to be replaced. The alternator also has a limited lifetime, and will need to be replaced after a certain amount of usage time. When parked, if the comfort systems and other loads require more energy than the battery can deliver, the fuel based motor will have to be started in order to enable the alternator to supply power to the loads, which is particularly inefficient and the noise and exhaust gasses may cause nuisance to the surroundings.

US 2015/0353036 A1 discloses a charge manager and controller for a vehicle passive energy system that employs an interface to a plurality of charge sources including intermittent sources, such as vehicle mounted solar photovoltaic (PV) panels and the vehicle engine and alternator, and an interface to a plurality of charge loads, such as a comfort heating/ventilation, refrigeration systems and auxiliary vehicle loads. Charge logic computes which of the plurality of sources will supply the charge current and which of the plurality of loads will receive the charge current, and a switch responsive to the charge logic will direct the charge current from at least one of the plurality of sources to at least one of the loads, in which the plurality of charge sources may be mutually exclusive from simultaneously powering a common load due to differing electrical characteristics required by the load.

SUMMARY OF THE INVENTION

It would be advantageous to provide an improved apparatus and method to provide a vehicle with sufficient electric energy, preferably from an environmentally friendly source.

This issue is addressed by an apparatus for providing power to a vehicle's electric power system, comprising
an auxiliary electric power unit;
a converter for converting electricity provided by the auxiliary electric power unit into electricity having an output voltage;
a sense line for electrically connecting a measurement device to the vehicle's electric power system;
a power line for connecting an output of the converter in parallel to the vehicle's electric power system;
a control unit configured to:
detect a running state of an alternator of the vehicle based on a measurement of a signal on the sense line measured by the measurement device; and
control the converter to set the output voltage in dependence on the detected running state.

The apparatus, thanks to its voltage control, can be used to supplement the alternator and battery of the vehicle during operation with an additional power supply. This way the burden on the battery and/or alternator of the vehicle is reduced, and therefore also the burden on the engine of the vehicle may be reduced. By controlling the output voltage in dependence on the detected running state of the alternator, the power generation of the alternator can be reduced. Also the output voltage may be adjusted to an optimal level for charging the vehicle's battery and/or supporting other loads, when the alternator is not running.

The control unit may be configured to continually adjust the output voltage based on measurement signals. This way, the output voltage can be continually adjusted to optimally supply electrical owe to the vehicle's electric power system.

The auxiliary electric power unit may comprise an auxiliary electric power storage medium. Moreover, the converter may be configured to convert the electricity provided by at least the auxiliary electric power storage medium and output it to the power line. This way the voltage provided by the auxiliary electric power storage medium is converted to a suitable voltage for the vehicle's electric system depending on the running status of the vehicle's alternator.

The auxiliary electric power unit may further comprise a passive power source configured to charge the auxiliary power storage medium. This allows the apparatus to become a source of environmentally friendly energy, in which energy may be stored in the auxiliary power storage medium until it is needed for the vehicle.

The control unit may be configured to detect whether the alternator of the vehicle is active based on the measurement signal, and set the output voltage to a first voltage if the alternator is active and set the output voltage to a second voltage if the alternator is not active, wherein the first voltage is higher than a nominal output voltage of the alternator and the second voltage is lower than the first voltage and higher than a nominal output voltage of the battery of the vehicle. The voltage may be adapted to prevent the alternator from consuming energy generated by, for example, a propulsion engine. When the apparatus provides a voltage that is higher than the voltage of the alternator, the alternator consumes less energy. If the alternator is not active, this higher voltage is not necessary. When the alternator is active, it may charge the battery for example. Alternatively, when the alternator is active, it may provide other loads of the vehicle with electricity.

In a first example, the first voltage has a value of at least 28.5 volt and/or the second voltage has a value between about 26 volt and 28 volt. These values may be advantageous for a vehicle using 24 Volt as the general voltage of its electric system.

In a second example, the first voltage has a value of at least 14.5 volt and/or the second voltage has a value of between about 13 volt and 14 volt. These values may be advantageous for a vehicle using 12 Volt as the general voltage of its electric system.

The control unit may be further configured to detect a battery charge status of a battery of the vehicle, based on a measurement of a signal on the sense line performed by the measurement device, and control a current provided to the power line in dependence on the battery charge status. Voltages and currents applied to charge a battery during a charging process have an influence on efficiency and lifetime of the battery. Thus, the apparatus may adapt the current and/or voltage provided to the power line accordingly.

The auxiliary electric power storage unit may comprise at least one battery, preferably a lithium iron phosphate battery, or at least one capacitor, preferably an electrochemical capacitor. This type of battery is suitable for the auxiliary electric power storage due to their relatively large capacity and charging and endurance properties.

The apparatus may comprise the vehicle's electric power system, wherein the power line is electrically connected in parallel to the vehicle's battery. The apparatus may be integrated in the vehicle, for example, or consist of a trailer coupled to a vehicle.

The apparatus may comprise an adapter to connect the apparatus to the electricity grid. The control unit may be configured to control to transfer energy from the passive energy source to the electricity grid, or transfer energy from the electricity grid to the auxiliary electric power storage medium. This allows the auxiliary electric power storage medium to be charged from external source, making the stored energy available for the vehicle later, for example on the road. It also allows environmentally friendly energy to be delivered to the power grid. For example, the control unit may be configured to control to transfer energy from the passive energy source to the electricity grid if the auxiliary electric power storage medium is fully charged and the vehicle's battery is fully charged, or transfer energy from the electricity grid to the auxiliary electric power storage medium if the auxiliary electric power storage medium is not fully charged.

The apparatus may comprise a trailer that comprises at least the auxiliary electric power unit and the converter, wherein the trailer comprises a mechanic coupling device configured to mechanically couple the trailer to a vehicle; and at least one connector configured to mate with a corresponding connector of the vehicle to exchange electricity with the vehicle, the connector comprising at least one power terminal electrically connected to the power line. This allows the vehicle to be connected to and disconnected from the apparatus easily. The connector can also be used without the mechanical coupling or without the trailer, for example if the apparatus is implemented in form of a stationary power station.

The at least one connector may comprise at least one sense terminal electrically connected to the sense line. This allows the sense line to be connected to and from the vehicle easily.

According to another aspect of the invention, a vehicle is provided, comprising a vehicle's battery;

a vehicle's alternator having at least two poles and configured to charge the vehicle's battery and any other load within the vehicle;

a mechanic coupling device configured to mechanically couple a trailer to the vehicle;

at least one connector configured to mate with a corresponding connector of the trailer to exchange electricity with the trailer, the connector comprising at least one power terminal, wherein the at least one power terminal of the connector is electrically connected to a pole of the at least two poles of the vehicle's battery.

This allows to reduce the amount of electric energy generated by the vehicle's alternator to charge the battery and provide the loads with sufficient energy.

The connector may comprise at least one sense terminal, wherein the sense terminal is electrically connected to a pole of the at least two poles of the vehicle's battery. This allows the auxiliary energy source to perform measurements to enhance the electric power delivery.

The vehicle's connector may comprise at least one further sense terminal, wherein the sense terminal and the further sense terminal are electrically connected to respective different poles of the at least two poles of the vehicle's battery. This allows more reliable measurement to be performed by a device connected to the connector.

Another aspect of the invention provides a method of providing power to a vehicle's electric power system. The method comprises converting, by a power converter, input electricity having an input voltage into output electricity having an output voltage;

providing the output electricity to the vehicle's electric power system by a power line connecting an output of the converter in parallel to the vehicle's electric power system;

detecting, by a control unit, a running state of an alternator of the vehicle based on a measurement of a signal on a sense line electrically connecting the control unit to the vehicle's electric power system; and controlling, by the control unit, the converter to set the output voltage in dependence on the detected running state.

The method may further comprise constantly adjusting, by the control unit, the output voltage to ensure proper and safe functioning.

The person skilled in the art will understand that the features described above may be combined in any way deemed useful. Moreover, modifications and variations described in respect of the system may likewise be applied to the method and to the computer program product, and modifications and variations described in respect of the method may likewise be applied to the system and to the computer program product.

BRIEF DESCRIPTION OF THE DRAWINGS

In the following, aspects of the invention will be elucidated by means of examples, with reference to the drawings. The drawings are diagrammatic and may not be drawn to scale. Throughout the drawings, similar items may be indicated by the same reference numerals.

DETAILED DESCRIPTION OF EMBODIMENTS

Certain exemplary embodiments will be described in greater detail, with reference to the accompanying drawings.

The matters disclosed in the description, such as detailed construction and elements, are provided to assist in a comprehensive understanding of the exemplary embodiments. Accordingly, it is apparent that the exemplary embodiments can be carried out without those specifically defined matters. Also, well-known operations or structures are not described in detail, since they would obscure the description with unnecessary detail.

Figure 1:
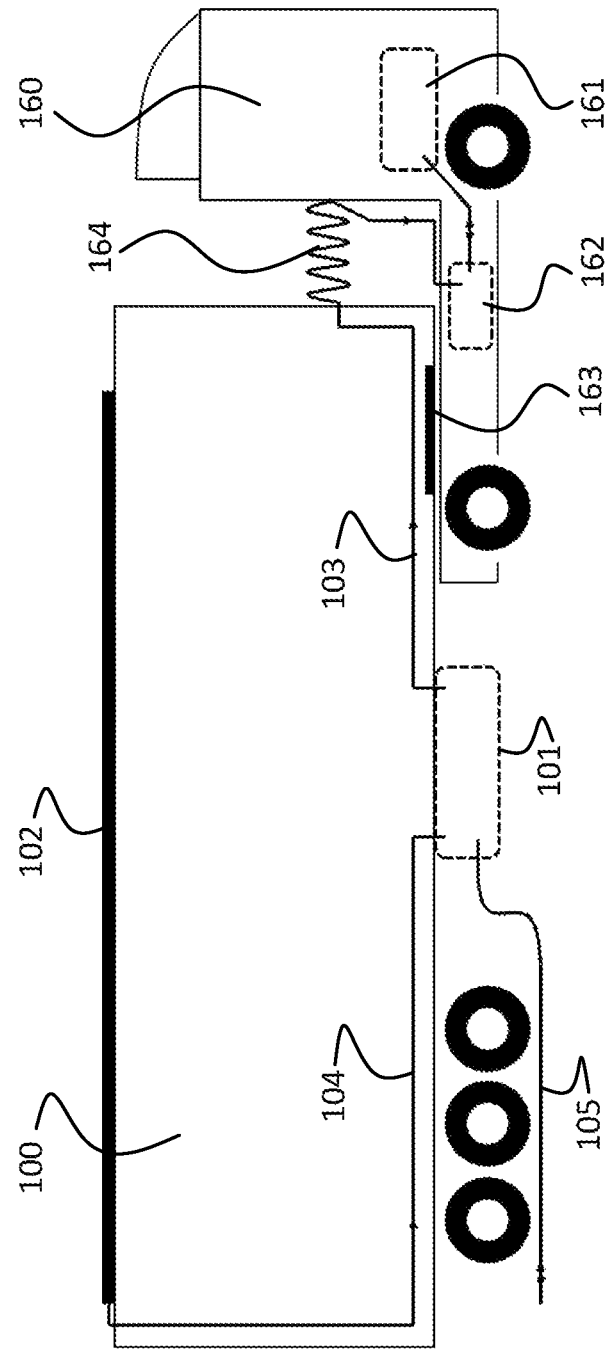
FIG. 1 illustrates a truck comprising a tractor and a trailer connected to the tractor.

FIG. 1 illustrates an implementation example of a truck including a tractor 160 with a trailer 100 connected to it via a mechanical coupling 163. Such mechanical coupling 163 is known in the art per se and needs not be described in further detail in the present document. The tractor comprises a tractor engine 161 and a tractor battery 162. The electric system of the tractor, including the tractor battery 162, may be connected via a loose cable 164 to trailer 100. For example, this connection may be implemented using connectors, which may be of a plug-and-socket type, for example. The trailer 100 may comprise a socket, and the loose cable 164 may have a plug at its end that fits into the socket. Alternatively, the loose cable 164 may be permanently connected to the trailer 100, and the tractor 160 may comprise the socket into which the connector may be fitted. Yet alternatively, both the tractor 160 and the trailer 100 may have their own socket, and an electric cable 164, having plugs on both ends, may be fitted into both sockets to electrically connect the tractor 160 to the trailer 100. The trailer 100 may comprise an auxiliary power system 101 that is electrically connected via cable 103 and loose cable 164, and via any connectors, to the electric system of the tractor 160. The trailer 100 may comprise a passive energy source, such as one or more photovoltaic panels 102, which may be electrically connected to the auxiliary power system 101. Also, the auxiliary power system 101 may be connectable to an external power supply (such as the power grid) via a cable 105.

Figure 2A:
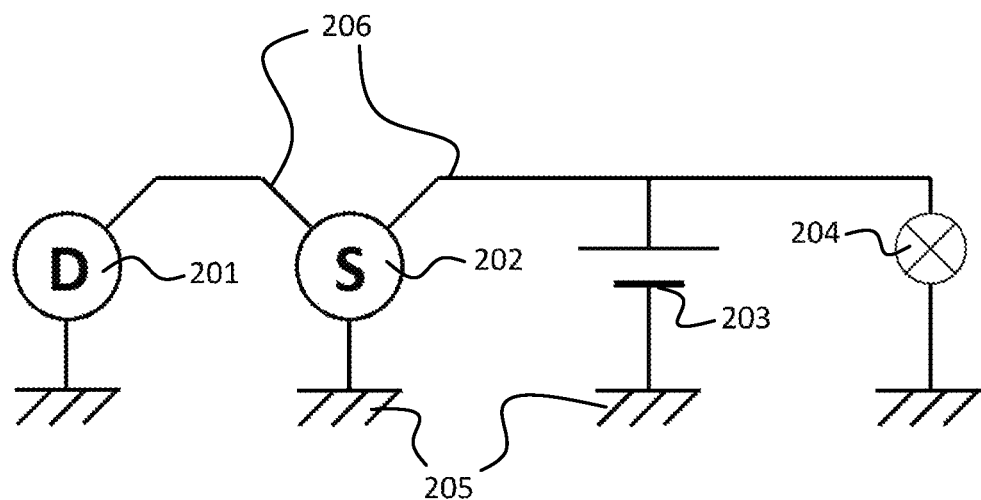
FIG. 2A shows a diagram of an electric system of, for example, a vehicle.

FIG. 2A shows a diagram of an electric system of, for example, a vehicle, such as a tractor 160. The electric system comprises an alternator 201, a starter motor 202, a battery 203, and several other loads 204. For example, these components may be connected to each other by wiring 206. In the implementation shown, one pole of each component is connected to the wiring 206, whereas the other pole of each component is connected to ground 205. Alternatively, the other pole of each component may be connected to each other by separate wiring (not illustrated).

Figure 2B:
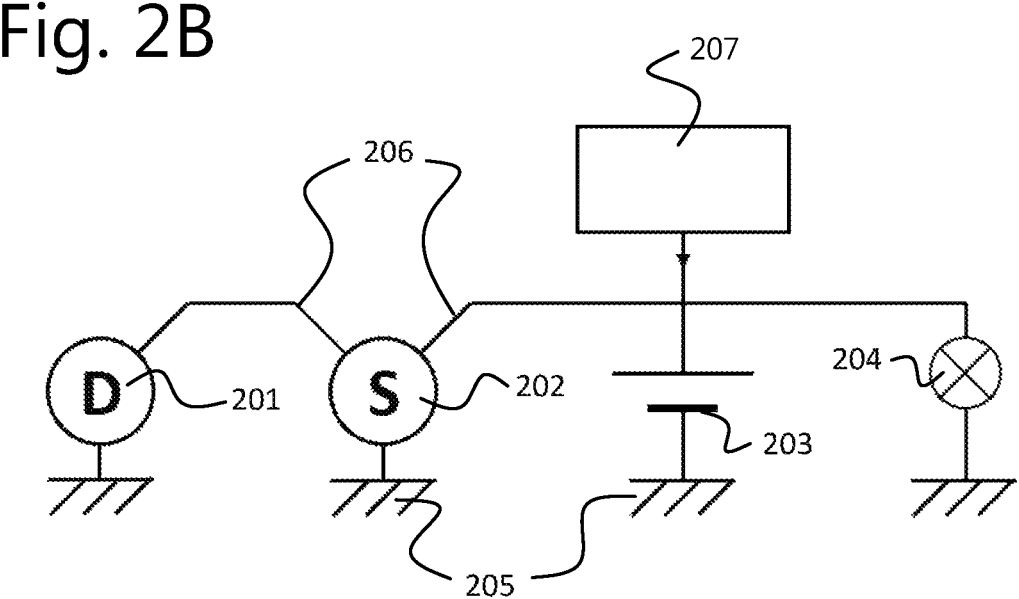
FIG. 2B shows a diagram of an electric system, to which an auxiliary power unit is electrically connected.

FIG. 2B shows a diagram of an electric system, to which an auxiliary power unit 207 is electrically connected. The auxiliary power unit may be implemented as a sustainable and reliable substitute for the inefficient electricity generation of e.g. a vehicle. This may be realized, for example, by preventing the alternator from generating electricity, since this is expensive and polluting. To that end, the auxiliary power unit may be configured to deliver cleaner and/or less expensive electricity to the electrical consumers in the vehicle. At times when the auxiliary power unit is stationary, it may be connected to the grid, so that the optional battery of the auxiliary power unit is charged, power may be transferred from the grid to the vehicle, or the auxiliary power unit can deliver electricity (clean electricity obtained from a passive electricity source, for example) back into the grid. As shown in FIG. 2B, the auxiliary power unit may simply be connected directly to the tractor's (lead acid) battery. The auxiliary power unit can be connected directly to the battery terminals, without intervening in the electric circuit of the tractor.

Figure 3:
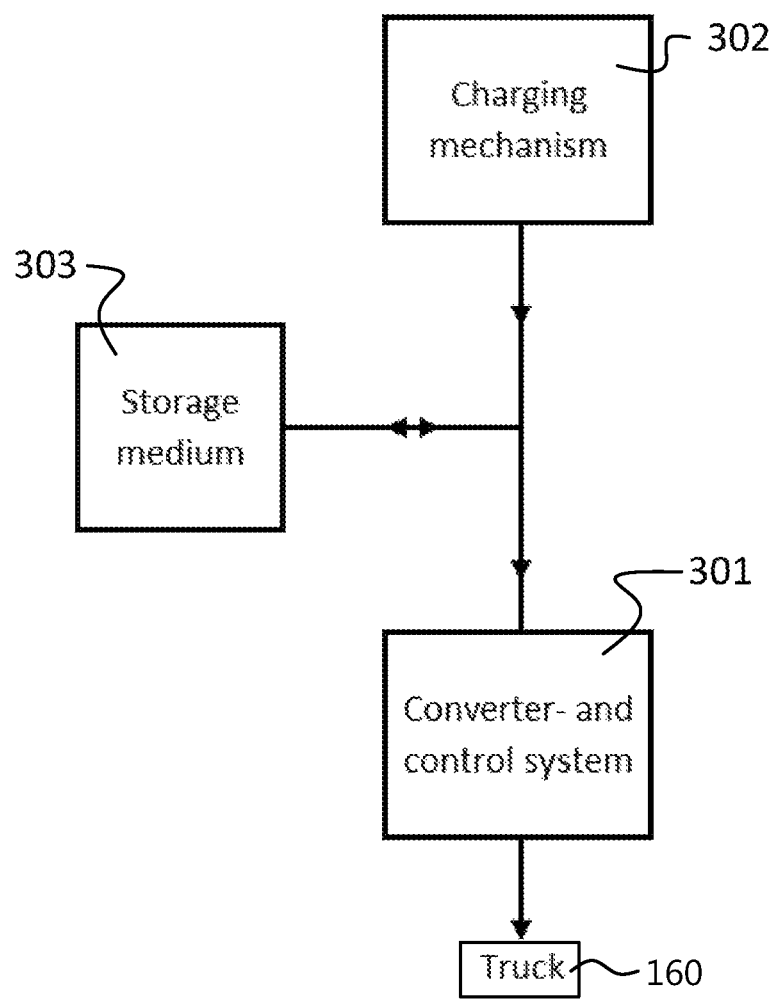
FIG. 3 shows a diagram illustrating example components of an auxiliary power unit.

FIG. 3 shows a diagram illustrating example components of an auxiliary power unit. The auxiliary power unit may comprise a storage medium 303 for storing electric energy, a charging mechanism 302, and a conversion and control system 301 to supply the (clean) electricity to a vehicle. The storage medium 303 can comprise one or more batteries, capacitors, supercapacitors, or any other means for storage of electric energy, or a combination thereof. For example, the storage medium 303 may comprise one or more electrochemical capacitors or other battery technologies.

The charging mechanism 302 is configured to charge the storage medium. This charging mechanism 302 can comprise a source of renewable energy, such as one or more photovoltaic panels, regenerative brakes, regenerative shock absorbers, or any other renewable energy source, or a combination thereof. The charging mechanism 302 can also be implemented in the form of (a connection to) the electricity grid or a combination of a renewable source and the electricity grid. Finally, the conversion and control system 301 is configured to supply electricity to the tractor and ensure that the alternator 201 doesn't generate electricity anymore. The system's voltage used for e.g. the storage medium 303 and the charging mechanism 302, before the conversion and control unit 301, can be chosen as desired.

The converter- and control system 301 may be configured to convert the system's voltage to the vehicle's electric system operating voltage.

Referring to FIG. 3, the storage medium 303 can function as a buffer and storage of electricity in the auxiliary power unit. When the auxiliary power unit is experiencing an overcapacity in production of renewable energy from the charging mechanism 302, the surplus can be absorbed by the storage medium 303. When the production of electricity is lower than the demand for electricity of the tractor, the shortage can be supplemented by electricity from the storage medium 303. The storage medium 303 enables the auxiliary power unit to operate reliably and consistently during a longer period of supplying electricity to the tractor.

Figure 4:
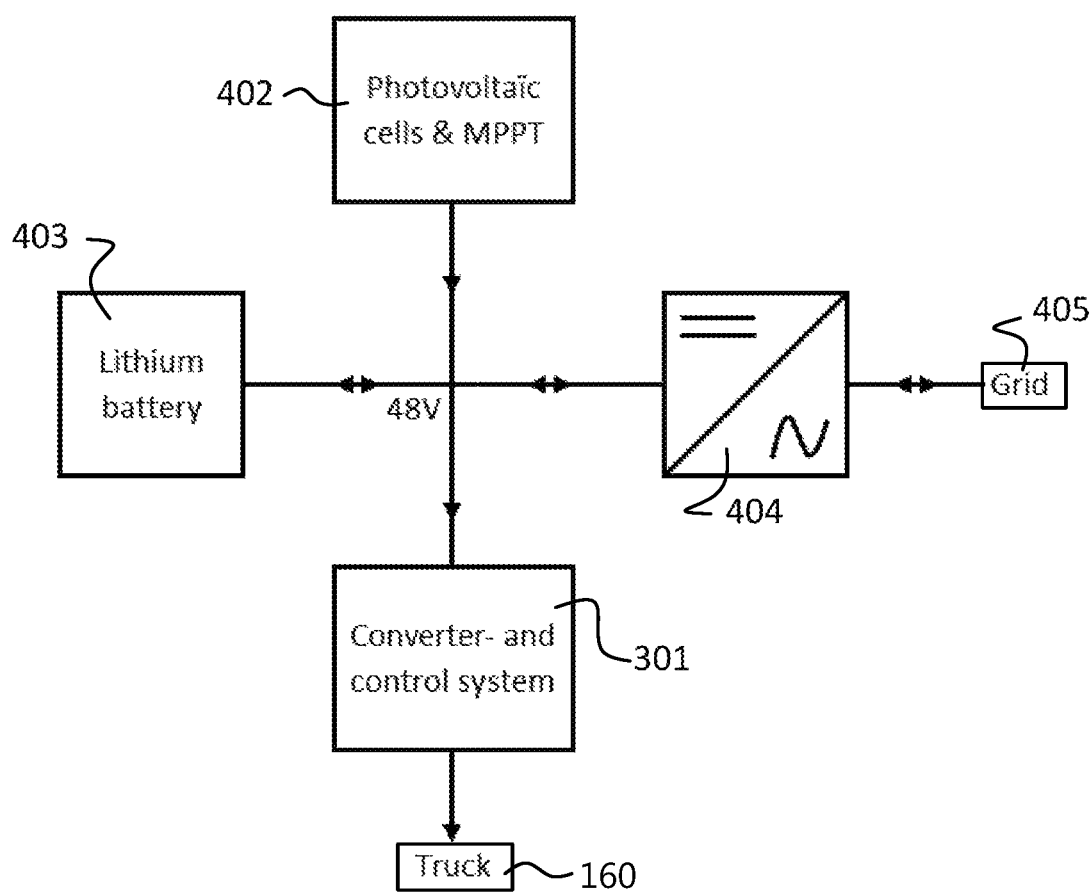
FIG. 4 shows a diagram of an example of an auxiliary power unit.

FIG. 4 shows a diagram of an example of an auxiliary power unit. As shown in the illustration, in this example the internal voltage used within the auxiliary power unit is 48 Volts. Flexible photovoltaic foil with an optional Multi Power Point Tracker (MPPT) 402 may be utilized as a renewable energy source. This lightweight foil may be very robust and may be installed easily on a trailer. By covering an outside surface of a trailer, for example the top surface of the roof of a trailer, with this photovoltaic foil, the trailer can generate electricity from solar energy. The photovoltaic foil may be electrically connected to a Multi Power Point Tracker (MPPT). The MPPT may be configured to condition the output current and voltage of the photovoltaic foil to a usable direct current with a specific voltage. This voltage may be, for example, 58.4 volts to charge a lithium battery 403. This voltage may be selected dependent on the voltage that the specific battery type used needs and can be setup accordingly.

Furthermore, a bi-directional direct current/alternating current inverter 404 may be provided for a connection to the electricity grid 405. During stationary moments, the inverter 404 can be connected to the grid 405, which can then provide electricity to charge the Lithium battery 403. This inverter may have an output voltage of 58.4 volts as well, but this is also dependent on the voltage that the specific battery type and model used needs and can also be setup accordingly. The photovoltaic foil and the inverter can charge the battery at the same moment, if applicable. During the connection with the electricity grid 405, the inverter 404 can net power back into the grid. There is also the possibility to install a 230-volt alternating current connection (e.g. a power socket) connected to the same terminals of the inverter 404 that may be connected to the grid 405, thereby making available a 230 volt power socket to power devices using the electricity from the lithium battery 403 or from the photovoltaic cells and MPPT 402 when no grid connection is available. Of course in the above sentences, 230 volt may be replaced by other voltages (e.g. 110 volt or 220 volt) as provided by the grid depending on geographic location. Depending on the preferences of the end user, there is the option to use an inverter 404 that can only go convert alternating current into direct current. In that configuration, this component 404 can function as a battery charger without the capability to net electricity back into the grid or install a connection to power 230 volts alternating current devices when a shore connection isn't available.

As storage medium, a lithium battery 403 may be used. A suitable type of Lithium technology may be a Lithium Iron Phosphate or LiFePO4 (LFP) battery. The LFP technology is robust and highly suitable for automotive applications. Additionally, the LFP battery has a longer life than the lead acid battery of the tractor in terms of lifecycles and the depth of discharge is less of an influence on the total life of the battery.

The conversion and control system 301 may be configured to convert the electricity of the auxiliary power unit to a varying direct current with specific voltage characteristics. When supplying power to the vehicle's electrical system, the conversion and control system 301 may constantly slightly adjust the output voltage, which may help to ensure optimal functioning and preventing any inrush currents or efficiency losses. In conventional vehicles, the voltage regulator of the vehicle's alternator compares the voltage of the electric system of the tractor with a reference voltage and then adjusts the output of the alternator. The auxiliary power unit 207 may be configured to provide the vehicle with electricity that has a voltage that is slightly higher than the vehicle's alternator 201 output voltage. This electricity may be supplied to any suitable point of the vehicle's electric system, for example to the lead acid battery 203 of the vehicle. The voltage regulator of the vehicle then registers this voltage and determines that the battery 203 of the vehicle is fully charged and no load is consuming the electric energy generated by the alternator 201. Therefore, the voltage regulator of the vehicle maximally reduces the alternator output. Meanwhile, the auxiliary power unit 207 supplies electricity to the vehicle and her electrical consumers 202, 203, 204. Because the alternator 201 is now generating less electricity, the combustion engine has a lower load. This in turn leads to a lower fuel consumption, since less energy has to be converted into electricity by the vehicle's alternator 201 itself. During stationary moments when the combustion engine is switched off, the auxiliary power unit 207 may supply electricity to the vehicle instead of the lead acid battery 203 of the tractor, which therefore experiences less cycles and less deep depths of discharge. Additionally, fuel consumption may be reduced since the alternator doesn't have to charge the vehicle's battery when the combustion engine is started after a stationary moment.

For example, the output side of the conversion and control unit 301 can be connected directly to the battery 203 of the vehicle. There is no need for alterations to the electrical systems of the tractor, there is no need to cut in the tractor wires.

Figure 5A:
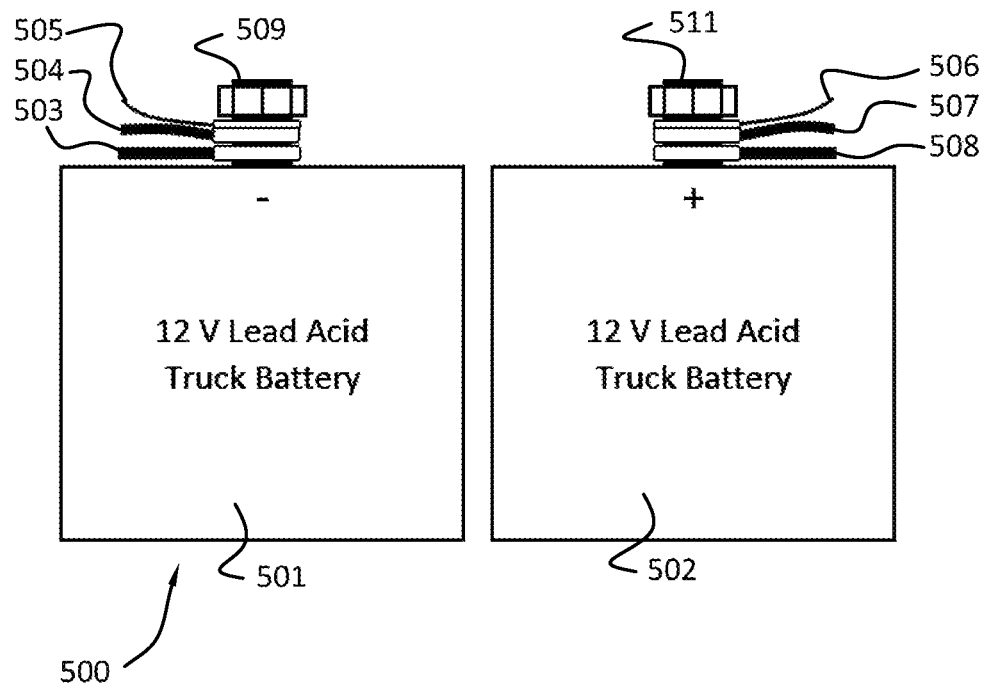
FIG. 5A and FIG. 5B show an example connection of the auxiliary power unit to the battery.
Figure 5B:
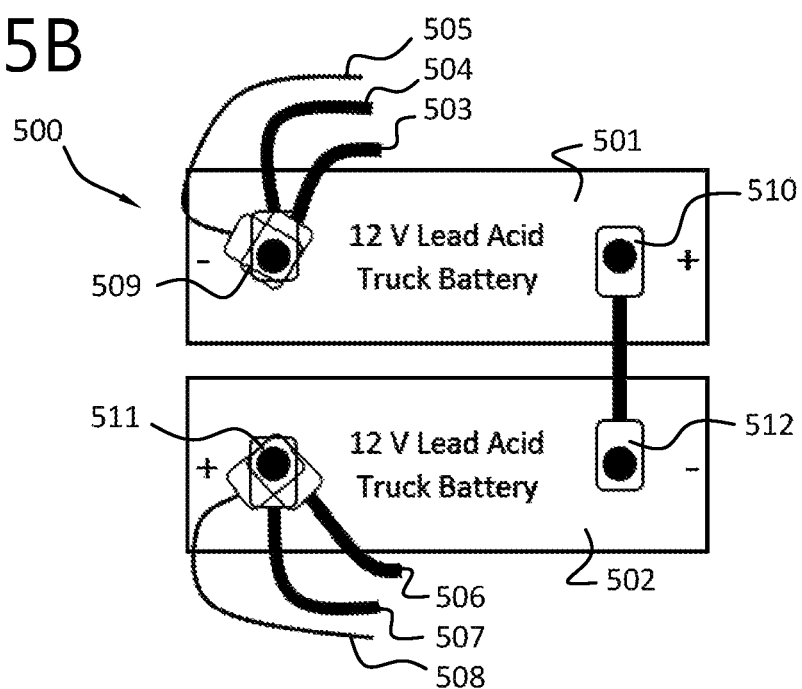

FIG. 5A and FIG. 5B show an example connection of the auxiliary power unit 207 to the battery 203 in greater detail. FIGS. 5A and 5B show a side view and a top view of the example battery 500, respectively. As illustrated, the battery 500 has a minus terminal 509 and a plus terminal 511. In the example, the battery 500 is a 24 Volts battery having two components 501 and 502 connected in series. The plus terminal of the first component 501 is connected to the minus terminal of the second component 512. The minus terminal 509 of the first component 501 is the minus terminal of the 24 Volts battery 500, and the plus terminal 511 of the second component 502 is the minus terminal of the battery 500. Other combinations of battery components are known in the art per se and are not described in this document in any detail. The minus terminal 509 is connected to the electric system of the vehicle (i.e., to the vehicle's alternator and loads) by means of cable 503. The plus terminal 511 is connected to the electric system of the vehicle by means of cable 506. The minus terminal 509 is connected to the auxiliary power unit 207 by means of the cable 504. The plus terminal 511 is connected to the auxiliary power unit 207 by means of the cable 507. The minus terminal 509 is also connected to the auxiliary power unit 207 by means of a further cable called a sense line 505. The plus terminal 511 is also connected to the auxiliary power unit 207 by means of a further cable called a sense line 508. It will be understood that the cables connected to the minus pole 509 are connected to their minus counterparts and the cables connected to the plus pole 511 are connected to their plus counterparts of the alternator 201 and auxiliary power unit 207, respectively. In other words, the plus cable and the plus sense cable of the conversion and control unit 301 may be connected to the plus terminal 511 of the vehicle's battery 500 and the minus connections may be connected to the minus terminal 509 of the vehicle's battery. The auxiliary power unit 207 may supply electricity to the electrical consumers 202, 203, 204 of the tractor via these terminals 509, 511. The battery remains charged, as long as the auxiliary power unit 207 supplies sufficient electricity.

For example, the conversion and control unit 301 may adjust any one or more of the following three variables during operational moments: the output voltage, the output current, and the on/off state of the converters. The following states may be distinguished:

Combustion engine 161 of the vehicle 160 is switched on (and the third state does not apply).

Combustion engine 161 of the vehicle 160 is switched off (and the third state does not apply).

Storage medium 303 of the auxiliary power unit 101 is empty (or not sufficiently charged) or there is no electric connection 164 between the auxiliary power unit 101 and a vehicle 160.

When the combustion engine 161 of the vehicle 160 is switched on, the alternator 201 also runs, which has an output of, for example, approximately 28 volts. In this situation, the auxiliary power unit 207 may be configured to supply a slightly higher voltage to the tractor, such as 29 volts, for the alternator 201 to reduce its output power and therefore reduce the load on the combustion engine 161. When the auxiliary power unit 207 cannot supply sufficient power to take over the alternator 201 entirely, the alternator 201 and auxiliary power unit 207 automatically share the load of the vehicle's electrical consumers 202, 203, 204;

When the combustion engine 161 of the vehicle is switched off, the alternator 201 also doesn't generate electricity. The vehicle 160 may then have a voltage of approximately 25 volts, depending on the state of charge of the vehicle's battery 203 and the electrical consumers 202, 204. The auxiliary power unit 207 now may supply a voltage that is slightly higher than the voltage supplied by the vehicle's battery 203, for example approximately 26.5 volts, to supply electrical consumers or charge the vehicle's battery. In a particular example, the charging current may be limited to maximally 0.1 C of the tractor battery, in case the auxiliary power unit 207 observes that the vehicle's battery is not fully charged. Herein, C denotes the current necessary to fully charge an empty battery in one hour time. More generally, the current may be limited to X*C when the vehicle's battery is not fully charged, wherein X is a constant value that may be, for example, 0.1. When the vehicle's battery 203 is fully charged and there is no electrical consumption by the vehicle's loads 202, 204, the auxiliary power unit 207 may function as a trickle charger.

In case the depth of discharge of the auxiliary power unit 207 battery or storage medium 303 reaches a specific low value, the converters in the conversion and control unit 301 may be configured to be switched off. They may be configured to be switched on once the charge of the auxiliary power unit 207 storage medium 303 reaches a specific higher value. This may be a hysteresis. The converters may be configured to be also immediately switched off when the electric connection to the tractor is broken and may be configured to be switched back on when a connection with a tractor is made. These operations may be performed by a control unit to be described elsewhere in this document.

The control unit may be configured to determine the presence of such a connection by monitoring the power line to the vehicle's electrical system and, for example, the vehicle's voltage. When the output current from the converters to the tractor shows an anomaly, such as suddenly dropping to zero, the converters may be switched off by the control unit until the control unit senses a vehicle's voltage on the output connections of the apparatus (e.g. on the sense line). Alternatively, when the control unit does not observe a normal voltage for the vehicle's electrical system (such as between 24 and 30 volts for a 24 volts vehicle) when measuring the vehicle's electrical system's characteristics, the converters may be switched off as well. This helps to avoid any danger to humans or materials during e.g. defects of the vehicle or the auxiliary power system.

Figure 6:
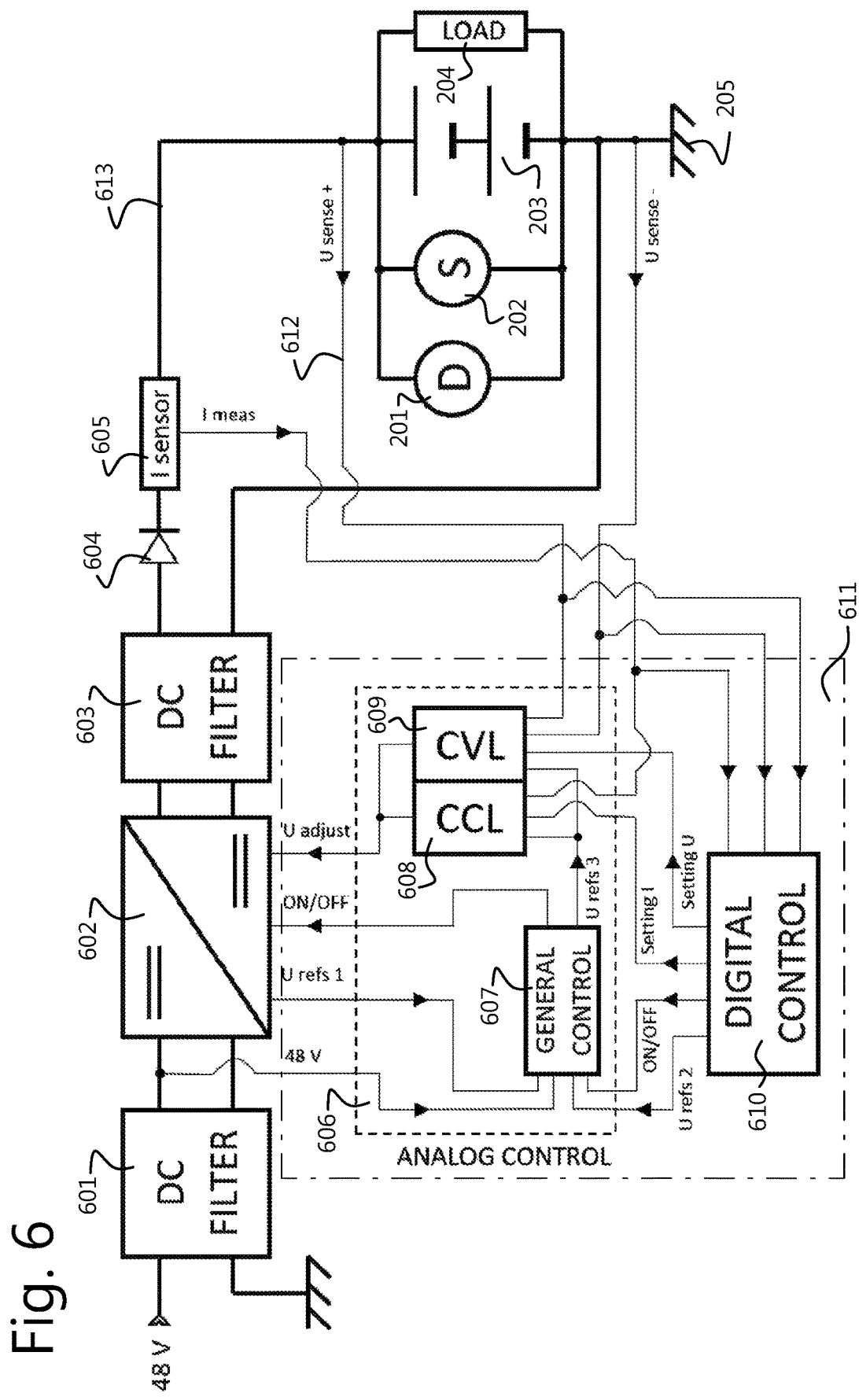
FIG. 6 shows a diagram of an example implementation of a conversion and control unit connected to the vehicle's electrical system.

FIG. 6 shows a diagram of an example implementation of a conversion and control unit 301. As illustrated, the conversion and control unit may comprise several components. Firstly, a converter 602 configured to convert electricity from about 48 volts to about 28 volts. These voltages are merely provided as illustrative examples. A configuration of one converter or several converters connected in parallel can be employed. Before and after the converter a DC filter 601, 603 may be provided, to remove any disruptions in the input and output of the converter 602. Between the output DC-filter 603 and the current sensor 605, an ideal diode 604 may be installed. This ideal diode 604 may ensure that the electricity can only flow in one direction and may protect the converter or converters 602. Every converter 602 may have its own ideal diode 604. An advantage of an ideal diode 604 may be avoidance of efficiency loss. The current sensor 605 may be configured to measure the current that flows between the auxiliary power unit 207 and the vehicle. The measurement value may be sent to the digital control part 610 and/or the constant current loop 608, for example. The figure also shows sense lines Usense+ and Usense−. These sense lines may be connected to the constant voltage loop 609 and/or the digital control part 610, optionally via a voltage sensor (not illustrated).

The logic behind the conversion and control unit may be implemented, for example, in a control unit 611. The control unit 611 may comprise an analog part 606 and a digital part 610. Although in the following a specific implementation of analog and digital parts is described, it will be understood that the functionality may be implemented differently. Some of the analog features described herein may be implemented by digital hardware and some of the digital features described herein may be alternatively implemented by analog circuitry. The analog part 606 may comprise two loops, in particular a constant voltage loop (CVL) 609 and a constant current loop (CCL) 608, and a general control part 607. The general control part 607 may have inputs of different voltages and supply usable reference voltages to the control loops 608, 609. Also, the general control part 607 may be configured to switch the converters on or off, as described elsewhere in this document. The control loops 608, 609 may be configured to adjust the output voltage of the converter 602 constantly to keep the system in balance.

The constant voltage loop 609 may be configured to measure the voltage of the vehicle's battery over the sense wires 505, 508 and compare this voltage to a reference voltage. Depending on the outcome of this comparison, the output voltage of the converters 602 may be dynamically increased or decreased. By giving the reference voltage different values, the output voltage of the converters 602 can be set on various voltages, depending on the situation of the vehicle (e.g. is the vehicle switched on or off?). In practice, the constant voltage loop 609 may ensure that the output voltage of the auxiliary power unit 207 on arrival at the vehicle's battery is high enough for the alternator 201 to reduce its alternator output power, but not so high that the vehicle's components risk being damaged. This output voltage may be adjusted constantly by the control unit 611, such that the electricity output matches the demand of the vehicle.

The constant current loop 608 can limit the output current of the converters 602. The output current may be measured by sensor 605 and compared with a reference current value. Depending on the outcome of this comparison, the output voltage of the converters 602 is increased or decreased, which causes the output current to respectively increase or decrease. By giving this reference current value specific values, the output current can be limited. For example, two different values may be used for this reference: one value equal to or above the maximum output current to be provided by the converters 602 (for unlimited current output), and one value to limit the output current to for example 0.1 C, which amounts to a value of 22.5 amps for a lot of tractor batteries.

The constant current loop 608 may be configured to limit the output current of the converters to avoid the output current to become too large. However the constant current loop 608 does not impose a minimal output current. For example, if the maximum output current is set to 22.5 amps, but the vehicle's battery is fully charged and there is none or little electrical consumption, then the converters will only supply enough current to fulfil the demand for electricity, which can be lower than 22.5 amps. This is regulated autonomously based on voltage.

The digital part 610 may comprise for example a processor or a microcontroller. The digital part 610 may be configured to perform the measurements and the collection of data, software calculations and comparisons, and giving commands to the analog sections 606 of the control unit 611. The system of the auxiliary power unit 207 may comprise a number of sensors, of which the data may be constantly (or at least regularly) generated and/or logged. This data may be used by the microcontroller for calculations and comparisons in software. The software may control the microcontroller to determine the state of the vehicle, whether the vehicle's battery is fully charged or not, and to signal commands based on all the relevant information. For example, the following commands can be given:

Output voltage.
Output current.
On/off state.

The output voltage command can set the output voltage to any specific value. The following are example output voltage commands. Set converter output voltage on nominal (e.g. approximately 29 volts), Set converter output voltage on a low charging voltage (e.g. approximately 26.5 volts), Set converter output voltage on a testing voltage (e.g. approximately 20 volts). With the testing voltage, the voltage of the tractor system can be measured, without the need for switching off the converters.

The output current command can set the output current to any specific value. The following are example output current commands. Do not limit the converter output current (e.g. implemented by a sufficiently high current value), Limit the output current to 0.1 C of the vehicle.

The on/off state command can control the converters to be switched on or off.

Figure 7:
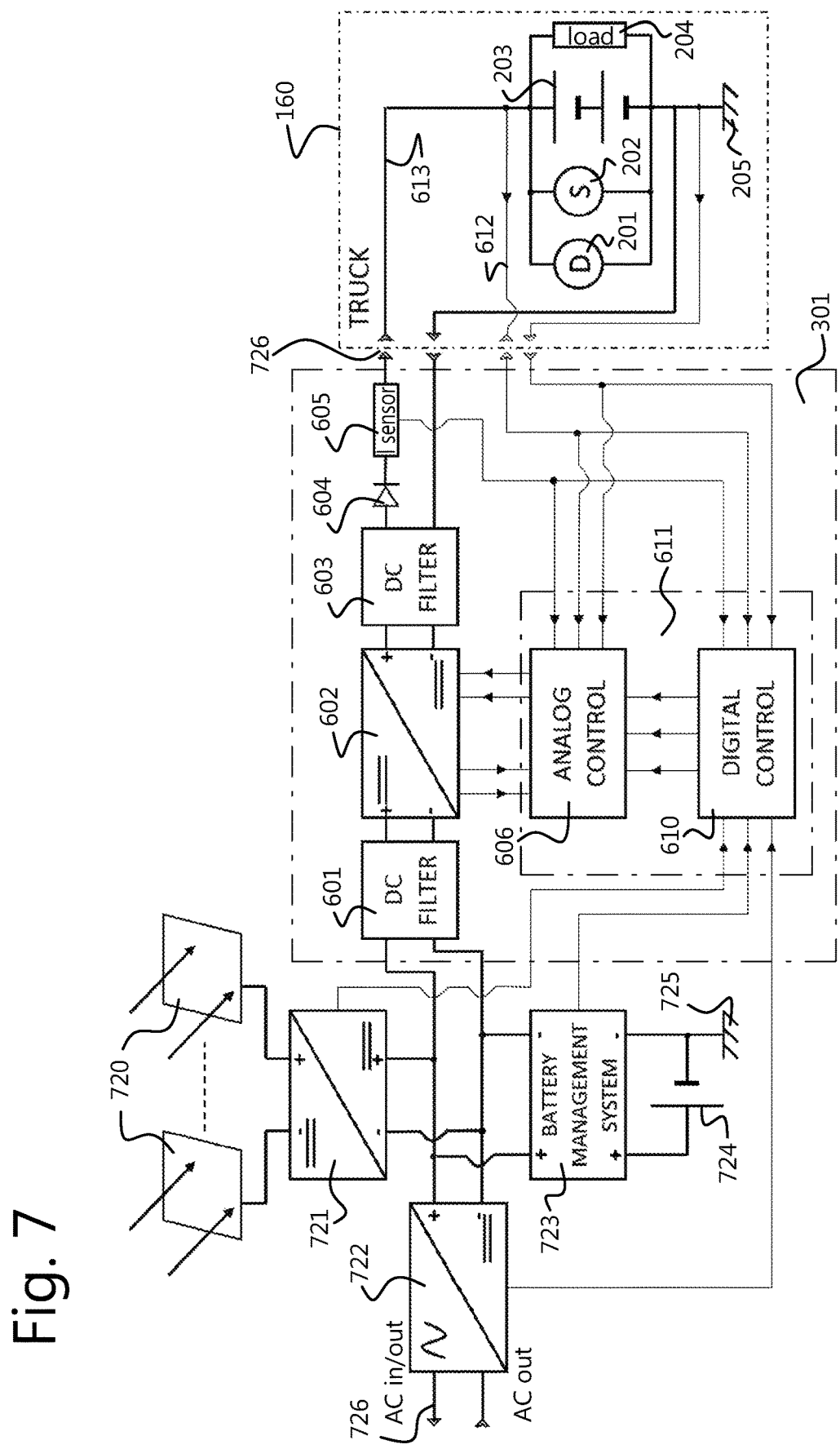
FIG. 7 shows a diagram of an example implementation including a storage medium, passive energy source and grid connection, connected to the vehicle's electrical system.

FIG. 7 illustrates an example with some additional detail. Elements of FIG. 7 that are similar to those shown in FIG. 6 have been marked with the same reference numeral and need not be described again. FIG. 7 shows an example of which components may be implemented in a vehicle 160. In the example, the vehicle only has the conventional alternator 201, starter 202, battery 203, and loads 204. However, the vehicle 160 has additional connections to the vehicle's battery, in particular the power line and the sense line that both lead to the conversion and control unit 301. The components of the conversion and control unit 301 may be part of a separate device, which may be part of a trailer or some stationary installation for example. The interface between the auxiliary power unit 207 and the vehicle 160 may have the form of a connector. The connections 726 realized by such a connector have been illustrated tentatively in the figure. Although bipolar connections have been illustrated, it is also possible to implement one of the poles by ground instead of by wiring.

FIG. 7 also shows example energy sources of the auxiliary power unit. For example, a number of photovoltaic panels 720 has been provided. They are connected to the conversion and control unit 301 via a converter 721. Also the power grid may be connectable via a converter 722. These power sources are also connected to the battery management system 723 to charge the storage medium 724. There may also be a connection to ground 725.

Figure 8:
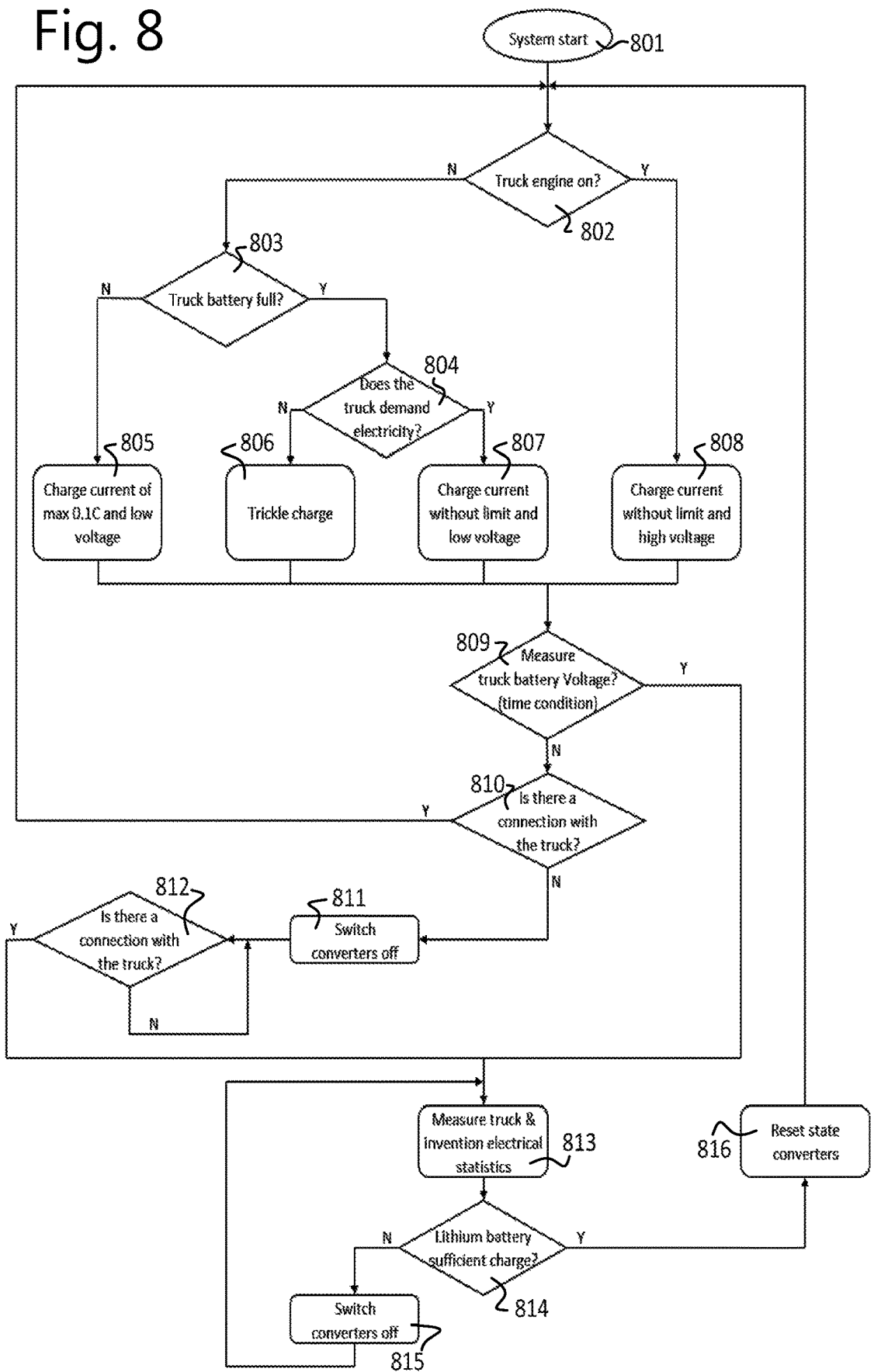
FIG. 8 shows a flowchart of a method that may be performed by the auxiliary power unit.

FIG. 8 shows a flowchart of a method that may be performed by the auxiliary power unit. The method may be implemented in particular in form of the control unit 611. The method starts at step 801 and proceeds to step 802, where it is determined whether the tractor engine is on. This may be determined by measuring the voltage on the sense line, for example, because the tractor engine causes the alternator to generate a particular voltage. If the tractor engine is on in step 802, the auxiliary power unit charges current without limit and supplies a voltage that is higher than the voltage produced by the alternator of the vehicle to the vehicle's electric system.

If the tractor engine is off in step 802, it is determined if the vehicle's battery is fully charged in step 803. This may be determined by a voltage measurement and/or a current measurement. If the vehicle's battery is not fully charged in step 803, the charge current is limited to a predetermined value, which may correspond to a certain percentage of the current needed to completely charge an empty battery in one hour. For example the current supplied by the auxiliary power unit may be limited to 10% of the said current.

If the vehicle's battery is fully charged in step 803, it is determined if the vehicle has a demand for electricity in step 804. If there is a demand for energy in step 804, unlimited current is provided to the vehicle in step 807 at a voltage that is lower than the voltage of the alternator and higher than the voltage of the battery. If the vehicle does not have a demand for electricity in step 804, a trickle charge is provided to the vehicle in step 806. This trickle charge may have, for example, a voltage of 27 volts (suitable for e.g. a 24 volts vehicle system. For other types of vehicle systems, the voltage may be adapted accordingly). Furthermore, the logic may determine to supply the vehicle's battery with a float charge and cut the power when the battery is full, allowing the battery to rest and discharge slightly. This may improve the service life of the vehicle's battery.

In step 809, it is determined whether it is time to measure the vehicle's battery voltage. For example, this may be performed regularly after a certain time interval. If it is not time to measure the tractor battery voltage, it is determined in step 810 if there is (still) a connection with the vehicle. This may be determined by the observation of an anomaly in the output current. If there is a connection to the vehicle in step 810, the method proceeds from step 802.

If there is no connection with the vehicle in step 810, the converters are switched off in step 811 so that no power is outputted by the auxiliary power unit. In step 812, the system waits until there is a connection with a vehicle.

If it is determined in step 812 that there is a connection with a vehicle, or it is determined in step 809 that it is time to measure the vehicle battery voltage, electric measurements are performed to determine the status of the vehicle and/or the status of the auxiliary power unit. Next, it is determined in step 814 if the storage medium contains sufficient charge so it can supply energy to the vehicle. If the storage medium does not contain sufficient charge in step 814, the converters are switched off in step 815 so the auxiliary power unit does not output electric energy, and the method proceeds from step 813. If the storage medium contains sufficient energy in step 814, the converters are switched on in step 816, so that the auxiliary power unit starts to output electric power to the vehicle, and the method proceeds from step 802.

Figure 9:
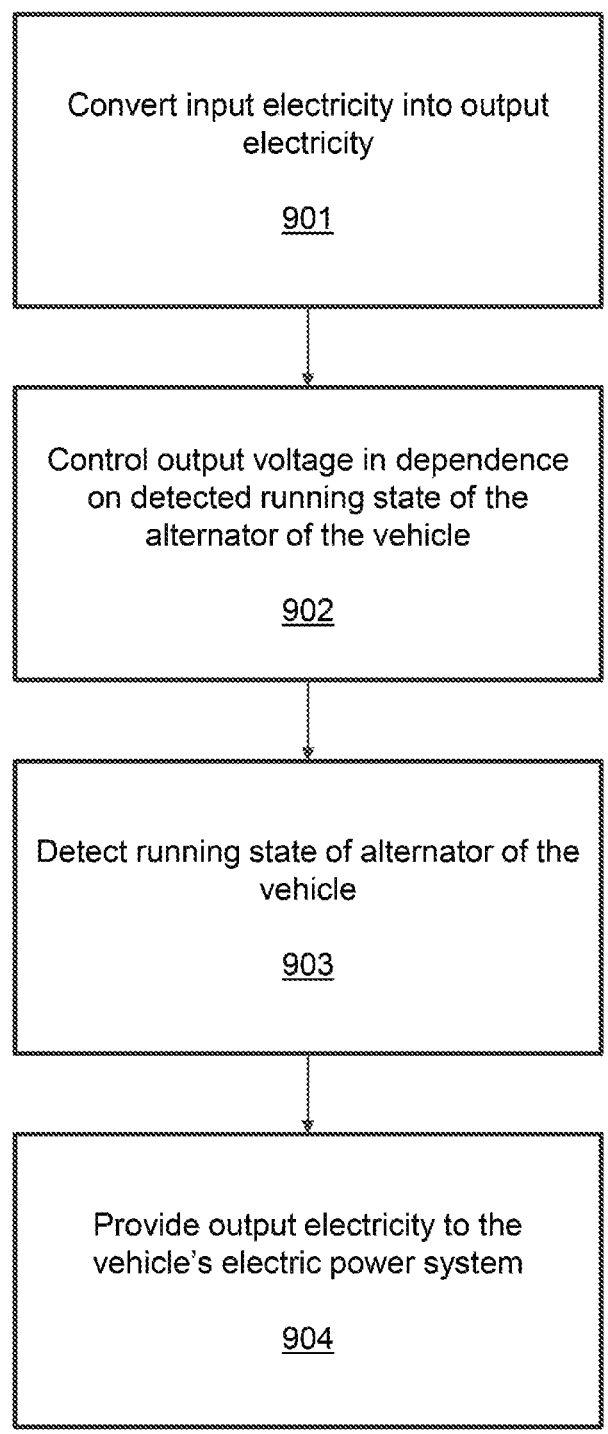
FIG. 9 illustrates a method of providing power to a vehicle's electric power system.

FIG. 9 illustrates a method of providing power to a vehicle's electric power system. In step 901, a power converter converts input electricity having an input voltage into output electricity having an output voltage. In step 902, a control unit detects a running state of an alternator of the vehicle based on a measurement of a signal on a sense line electrically connecting the control unit to the vehicle's electric power system. In step 903, the control unit controls the converter to set the output voltage in dependence on the detected running state. After that, the method may be repeated. In step 904, the output electricity is provided to the vehicle's electric power system by a power line connecting an output of the converter in parallel to the vehicle's electric power system. The method may be repeated to adjust the output of the converter according to e.g. a change in the running state.

In some implementations, the auxiliary power may be temporarily switched off, or set to a very low output voltage, before and during a voltage measurement on the sense line.

Figure 10:
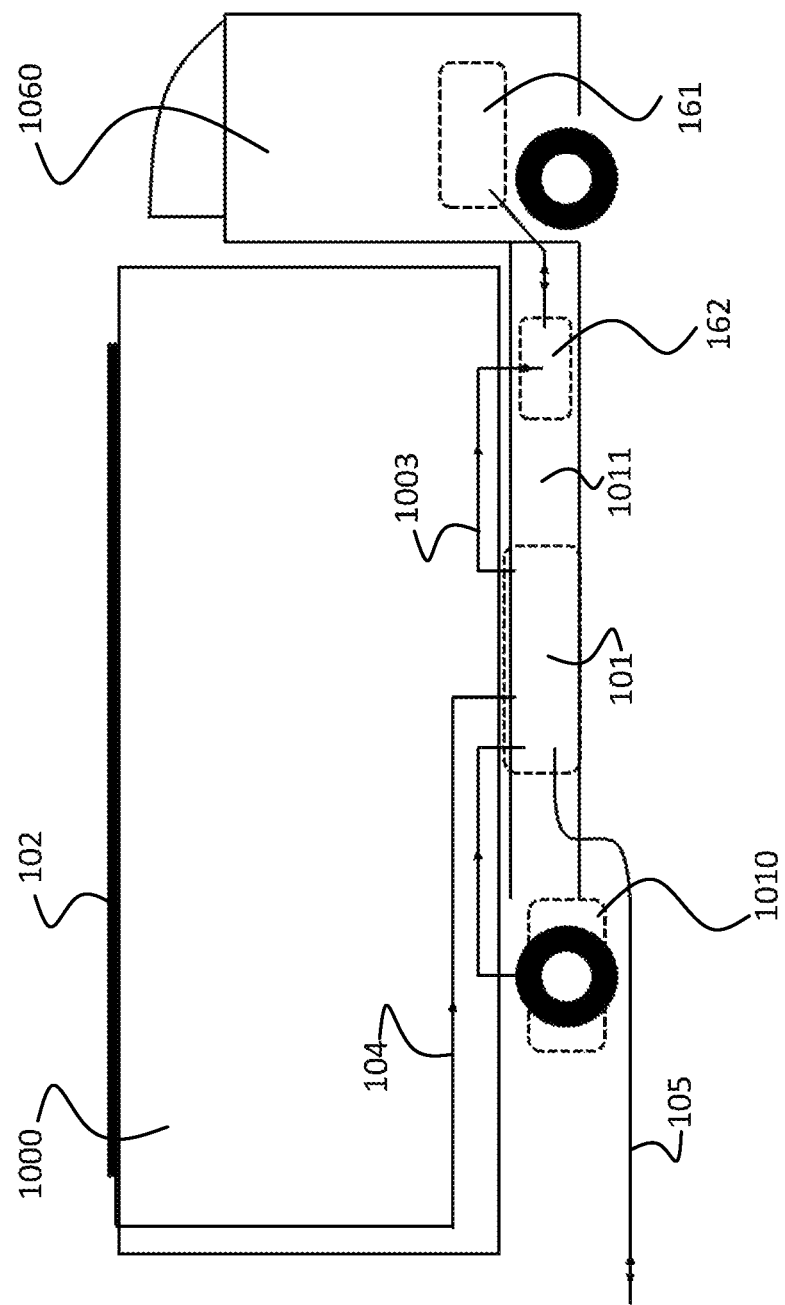
FIG. 10 illustrates a rigid truck.

FIG. 10 shows an alternative embodiment of a vehicle with an integrated auxiliary power unit. For example, as illustrated, the auxiliary power unit may be integrated in a lorry comprising a cabin 1060 and cargo space 1000 rigidly connected to each other by means of a frame 1011. Photovoltaic panels 102 may be fixed to e.g. an optional roof of the cargo space 1000. The tractor engine 161 may be located below the cabin 1060. The tractor battery 192 and the auxiliary power system 101 may be located below the cargo space 1000. These locations can be varied. A cable 1003 may connect the auxiliary power system 101 to the tractor battery 162 (or to another part of the electric system of the tractor, in parallel to the tractor battery 162). The cable 1003 may comprise the power line and the sense line. Alternatively, separate cables may be provided for the power line and for the sense line. The photovoltaic panels 102 may be connected to the auxiliary power system 101 via cable 104, and the auxiliary power system 101 may be connectable to the power grid via cable 105. In FIG. 10, an additional power source is shown. Regenerative brakes 1010 may collect energy when applying the break during driving. This energy may be provided to the auxiliary power system 101 via a cable. The energy from the regenerative brakes 1010 may be used to charge the auxiliary storage medium, as described elsewhere in this document in greater detail. The regenerative brakes can be added to any embodiment of the system, also to the tractor-and-trailer embodiment of FIG. 1, for example. A connector to effect the connection of the auxiliary power system 101 to the tractor is not necessary when the auxiliary power system 101 is an integral part of the vehicle, as is the case in this embodiment.

Figure 11A:
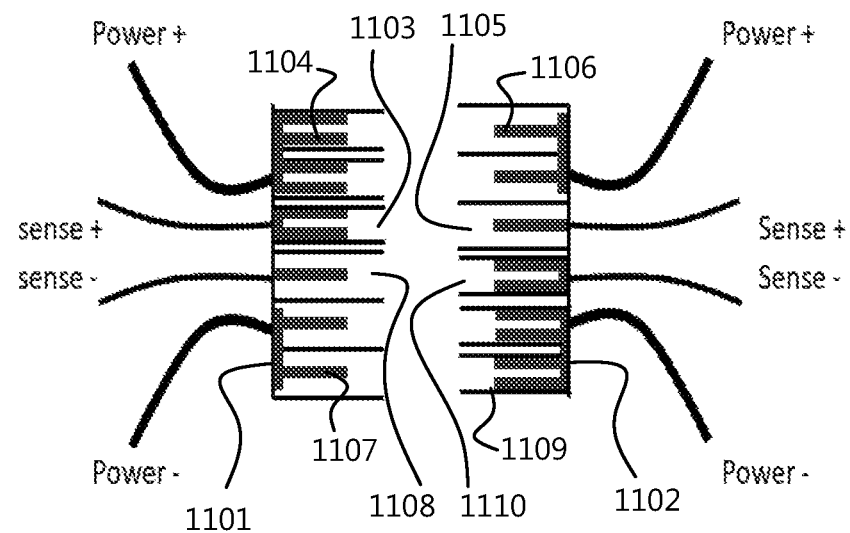
FIG. 11A and FIG. 11B show examples of connectors.
Figure 11B:
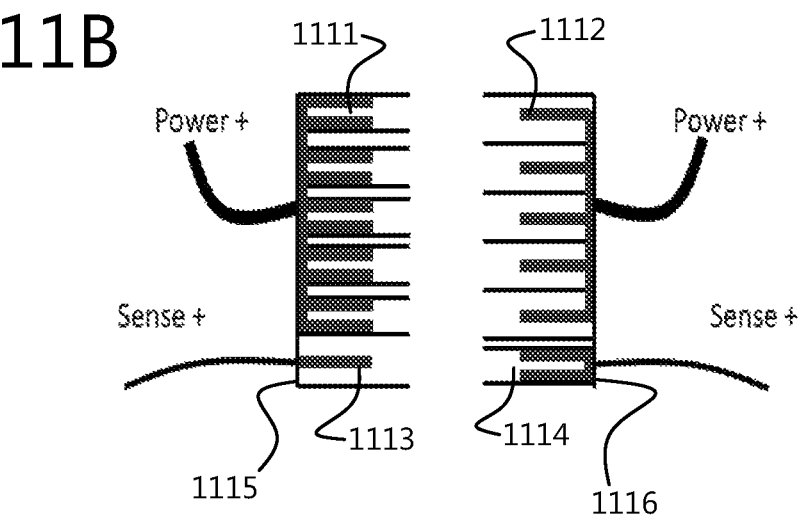

FIG. 11A and FIG. 11B show examples of the connector disclosed in this document. Other implementations of the connector may be devised by the person skilled in the art based on the present disclosure. The connectors have been designed such that it is not possible to connect the wrong terminals. Also, both male as female contacts may be shielded from contact with objects or persons. FIG. 11A shows two connectors 1101 and 1102 that fit together in a male-female fashion. For example, connector 1101 can be the connector of the auxiliary power system 101, and connector 1102 can be the connector of the tractor 160/tractor battery 162, or vice versa. The connector can have pins or terminals for each wire to be connected. The connector 1101 has a terminal 1104 for the positive pole of the power line, a terminal 1107 for the negative pole of the power line, a terminal 1103 for the positive pole of the sense line, and a terminal 1108 for the negative pole of the sense line. The connector 1102 also has a terminal 1106 for the positive pole of the power line, a terminal 1109 for the negative pole of the power line, a terminal 1105 for the positive pole of the sense line, and a terminal 1110 for the negative pole of the sense line. FIG. 11B shows another example of a connector 1115 to be fitted to a connector 1116, in which only terminals for one pole are provided for each line. The other pole can be connected through ground, for example. Although not shown in FIG. 11B, a separate ground terminal might be provided in the connectors 1115, and 1116. The connector 1115 has a terminal 1111 for the positive pole of the power line and a terminal 1113 for the positive pole of the sense line. The connector 1116 also has a terminal 1112 for the positive pole of the power line and a terminal 1114 for the positive pole of the sense line. In all cases, further terminals may be added to the connectors for any other purpose.

Figure 12:
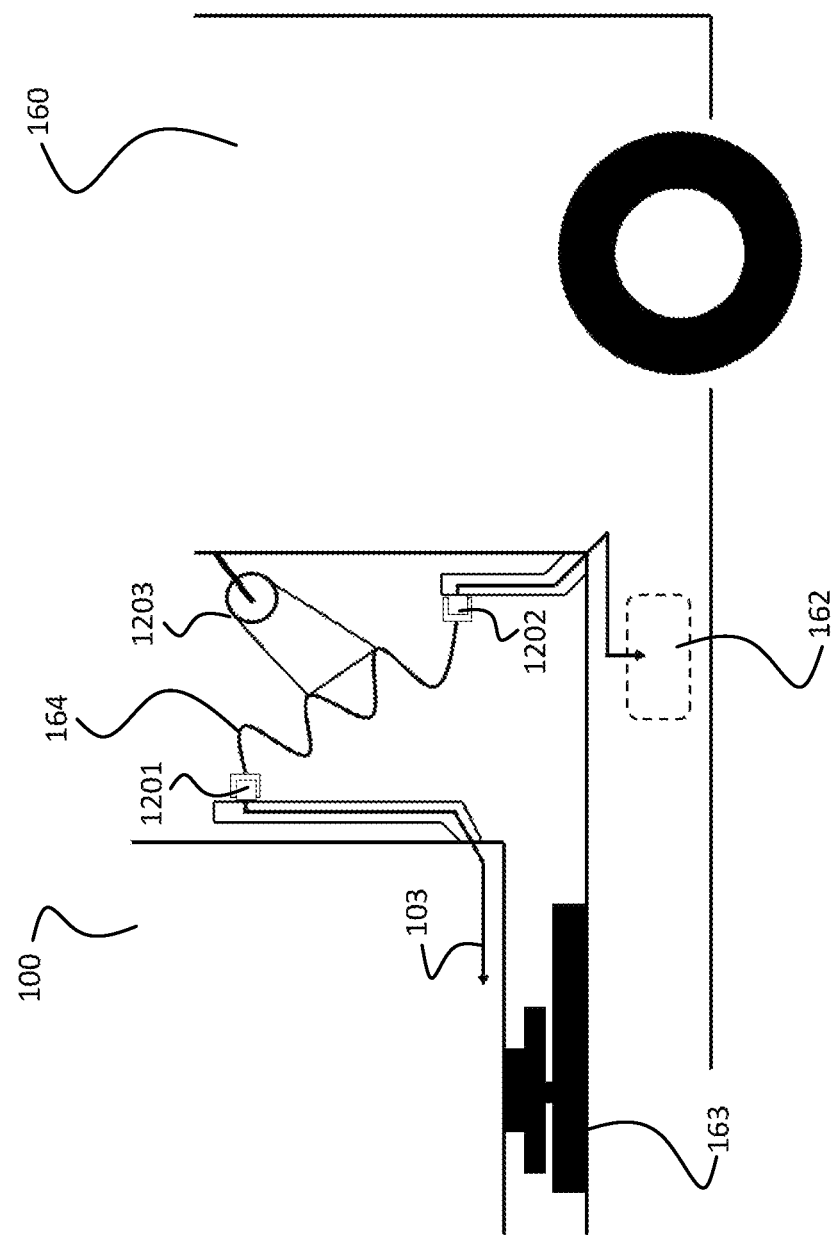
FIG. 12 shows an example connection between the tractor and trailer shown in FIG. 1 in greater detail.

FIG. 12 shows an example of a connection of a trailer 100 to a tractor 160. The loose cable 164 can be connected via connector pairs 1201 and 1202. Each connector pair 1201 and 1202 may comprise two matching connectors 1101 and 1102, for example. The loose cable 164 may be held in place with a pulley 1203, for example.

A sense line in addition to the power line has an advantage that the voltage measurement can be performed reliably on the sense line even during power delivery through the power line. The power line and connector, through which the electric energy is supplied from the auxiliary power unit to the vehicle, may be configured with specifications to accept high power transfer of, for example, at least 2 kW.

For example, the auxiliary electric power storage unit comprises at least one battery, preferably a lithium iron phosphate battery, or at least one capacitor, preferably an electrochemical capacitor. Other kinds of battery technology, including other kinds of lithium batteries, may be used alternatively. The lithium iron phosphate battery has an advantage that it has a long life cycle, good thermal stability, a high safety and tolerance to abuse, and/or a higher current rating. A capacitor is particularly suitable for quick charging/discharging applications, for example to store electricity harvested from a mechanical break.

Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

Examples are disclosed by means of the following clauses.

Clause 1. An apparatus for providing power to a vehicle's electric power system, comprising
a converter (602) for converting input electricity having an input voltage into output electricity having an output voltage;
a sense line (612) for electrically connecting a control unit (611) to the vehicle's electric power system;
a power line (613) for connecting an output of the converter (602) in parallel to the vehicle's electric power system; and
the control unit (611) configured to:
detect a running state of an alternator (201) of the vehicle based on a measurement of a signal on the sense line (612); and
control the converter (602) to set the output voltage in dependence on the detected running state.

Clause 2. The apparatus of clause 1, further comprising an auxiliary electric power storage medium (742) to provide the electric input power, and wherein the converter (602) is configured to convert the electricity provided by at least the auxiliary electric power storage medium (724) into the output electricity having the output voltage and output it to the power line (613).

Clause 3. The apparatus of clause 2, further comprising a passive power source (720) configured to charge the auxiliary power storage medium (724).

Clause 4. The apparatus of clause 1, wherein the control unit (611) is configured to detect whether the alternator (201) of the vehicle is active based on the measurement signal, and set the output voltage to a first voltage if the alternator (201) is active and set the output voltage to a second voltage if the alternator (201) is not active, wherein the first voltage is higher than a nominal output voltage of the alternator (201) and the second voltage is lower than the first voltage and higher than a nominal output voltage of a battery (203) of the vehicle.

Clause 5. The apparatus of clause 4, wherein the first voltage has a value of at least 28.5 volt and/or the second voltage has a value between about 26 volt and 28 volt.

Clause 6. The apparatus of clause 4, wherein the first voltage has a value of at least 14.5 volt and/or the second voltage has a value of between about 13 volt and 14 volt.

Clause 7. The apparatus of any preceding clause, wherein the control unit (611) is further configured to:
detect a battery charge status of a battery (203) of the vehicle, based on a measurement of a signal on the sense line (612) performed by the control unit (611), and
control a current provided by the converter (602) to the power line (613) in dependence on the battery charge status.

Clause 8. The apparatus of any one of clauses 2 to 7, wherein the auxiliary electric power storage medium (724) comprises at least one battery, preferably a lithium iron phosphate battery, or at least one capacitor, preferably an electrochemical capacitor.

Clause 9. The apparatus according to any preceding clause, further comprising the vehicle's electric power system (201, 202, 203, 204), wherein the power line (613) is electrically connected in parallel to the vehicle's battery (204).

Clause 10. The apparatus according to any one of clauses 3 to 9, further comprising an adapter (722) to connect the apparatus to the electricity grid (726), wherein the control unit (611) is configured to control to:
transfer energy from the passive energy source (720) to the electricity grid (726), or
transfer energy from the electricity grid (726) to the auxiliary electric power storage medium (724).

Clause 11. The apparatus of any preceding clause, further comprising a trailer (100) that comprises at least the auxiliary electric power medium (724) and the converter (602), wherein the trailer (100) comprises:
a mechanic coupling device (163) configured to mechanically couple the trailer (100) to a vehicle (160); and
at least one connector configured to mate with a corresponding connector of the vehicle (160) to exchange electricity with the vehicle (160), the connector comprising at least one power terminal (726) electrically connected to the power line (613).

Clause 12. The apparatus of clause 11, wherein the at least one connector further comprises at least one sense terminal electrically connected to the sense line (612).

Clause 13. A vehicle comprising
a vehicle's battery (203);
a vehicle's alternator (201) having at least two poles and configured to charge the vehicle's battery (203) and any other load (202, 204) within the vehicle (160);
a mechanic coupling device (163) configured to mechanically couple a trailer (100) to the vehicle (160);
at least one connector configured to mate with a corresponding connector of the trailer (100) to exchange electricity with the trailer (100), the connector comprising at least one power terminal (726), wherein the at least one power terminal (726) of the connector is electrically connected to a pole (511) of the at least two poles (509, 511) of the vehicle's battery (203).

Clause 14. The vehicle according to clause 13, wherein the connector further comprises at least one sense terminal, wherein the sense terminal is electrically connected to a pole (511) of the at least two poles (509, 511) of the vehicle's battery (203).

Clause 15. A method of providing power to a vehicle's electric power system, comprising
converting (901), by a power converter, input electricity having an input voltage into output electricity having an output voltage;
detecting (902), by a control unit, a running state of an alternator of the vehicle based on a measurement of a signal on a sense line electrically connecting the control unit to the vehicle's electric power system; and controlling (903), by the control unit, the converter to set the output voltage in dependence on the detected running state; and providing (904) the output electricity to the vehicle's electric power system by a power line connecting an output of the converter in parallel to the vehicle's electric power system.

The invention claimed is:

1. A vehicle with a trailer,
wherein the vehicle comprises:
a battery;
an alternator having at least two poles and configured to charge the battery and any other load within the vehicle;
a mechanical coupling device configured to mechanically couple the trailer to the vehicle; and
at least one connector configured to mate with a corresponding at least one connector of the trailer to exchange electricity with the trailer, the at least one connector comprising at least one power terminal, wherein the at least one power terminal of the at least one connector is electrically connected to a pole of at least two poles of the battery, wherein the at least one connector further comprises at least one sense terminal, wherein the sense terminal is electrically connected to a sense line for connecting a control unit to an electric power system of the vehicle; wherein the trailer comprises:
a converter for converting input electricity having an input voltage into output electricity having an output voltage;
an auxiliary electric power storage medium to provide the input electricity, wherein the converter is configured to convert the input electricity provided by at least the auxiliary electric power storage medium into the output electricity having the output voltage and output it to a power line;
a mechanical coupling device configured to mechanically couple the vehicle to the trailer;
the at least one connector of the trailer configured to mate with the at least one connector of the vehicle to exchange electricity with the vehicle, the at least one connector of the trailer comprising at least one power terminal electrically connected to the power line and at least one sense terminal electrically connected to the sense line; and the control unit configured to:
detect a running state of the alternator based on a measurement of a voltage on the electric power system of the vehicle, using the sense line; and
control the converter to set the output voltage in dependence on the detected running state.

2. The vehicle with trailer of claim 1, wherein the control unit is configured to perform the control of the converter to set the output voltage by:
setting a reference voltage in dependence on the detected running state;
measuring a further voltage of the vehicle's power system over the sense line;
comparing the further measured voltage to the reference voltage; and
controlling the converter to increase or decrease the output voltage of the converter in dependence on the outcome of the comparison.

3. The vehicle with trailer of claim 1, further comprising a passive power source configured to charge the auxiliary power storage medium.

4. The vehicle with trailer of claim 1, wherein the control unit is configured to detect whether the alternator is active based on the measurement, and set the output voltage to a first voltage when the alternator is active and set the output voltage to a second voltage when the alternator is not active, wherein the first voltage is higher than a nominal output voltage of the alternator and the second voltage is lower than the first voltage and higher than a nominal output voltage of the battery.

5. The vehicle with trailer of claim 1, wherein the control unit is further configured to: detect a battery charge status of the battery, based on a measurement of a signal on the sense line performed by the control unit, and control a current provided by the converter to the power line in dependence on the battery charge status.

6. The vehicle with trailer of claim 1, wherein the auxiliary electric power storage medium comprises at least one battery, preferably a lithium iron phosphate battery, or at least one capacitor, preferably an electrochemical capacitor.

7. The vehicle with trailer of claim 4, wherein the first voltage has a value of at least 28.5 volt and/or the second voltage has a value between about 26 volt and 28 volt.

8. The vehicle with trailer of claim 4, wherein the first voltage has a value of at least 14.5 volt and/or the second voltage has a value of between about 13 volt and 14 volt.

9. The vehicle with trailer of claim 3, further comprising an adapter to connect the trailer to an electricity grid, wherein the control unit is configured to control to: transfer energy from the passive energy source to the electricity grid, or transfer energy from the electricity grid to the auxiliary electric power storage medium.

10. A system for providing power to an electric power system of a vehicle coupled to a trailer, the system comprising:
the trailer, wherein the trailer comprises:
a mechanical coupling device configured to mechanically couple the trailer to the vehicle;
a converter for converting input electricity having an input voltage into output electricity having an output voltage;
an auxiliary electric power storage medium to provide the input electricity, wherein the converter is configured to convert the input electricity provided by at least the auxiliary electric power storage medium into the output electricity having the output voltage and output it to a power line;
a connector configured to mate with a corresponding connector of the vehicle to exchange electricity with the vehicle and the power system thereof, the connector of the trailer comprising at least one power terminal electrically connected to the power line and at least one sense terminal electrically connected to a sense line; and
a control unit configured to:
detect a running state of an alternator of the vehicle based on a measurement of a voltage on the electric power system of the vehicle, using the sense line; and
control the converter to set the output voltage in dependence on the detected running state;
and the converter configured to:
provide the output electricity to the vehicle's electric power system by the power line connecting the output of the converter in parallel to the electric power system of the vehicle coupled to the trailer.

* * * * *